United States Patent Office 3,189,412

Patented June 15, 1965

3,189,412

METHOD OF MANUFACTURING BORON NITRIDE

Anthony Arthur Robinson Wood, Watford, and Eric Campbell Shears, Putney, London, England, assignors to United States Borax & Chemical Corporation, a corporation of Nevada No Drawing. Filed Mar. 19, 1959, Ser. No. 800,382
6 Claims. (Cl. 23—191)

This invention relates to the production of boron nitride.

According to the present invention, boron nitride is made by a method comprising passing nitrogen (or ammonia or another nitrogen-providing gas) over a heated intimate mixture comprising boric oxide (or boric acid or another boric-oxide-providing substance), carbon, and a catalyst constituted by a transition metal, rare-earth metal, alkaline-earth metal, alkali metal, or a compound of such a metal, or a mixture of such metals or compounds.

Preferably the catalyst is constituted by molybdenum, niobium, manganese, chromium, calcium, barium or strontium, or a compound of one of these metals, or a mixture of two or more of these metals or compounds of these metals. However, we have also found that a useful or at least appreciable catalytic effect is obtainable with the following metals or compounds of them: lithium, sodium, potassium, rubidium, caesium, magnesium (this element being counted as an alkaline-earth metal in this specification), lanthanum, cerium, titanium, vanadium, iron, cobalt, nickel, copper, zinc, yttrium, zirconium, tantalum, tungsten or thorium. In general it is convenient to use the rare-earth metal and transition metal catalysts in the form of an oxide, and to use the alkali metal and alkaline-earth metal catalysts in the form of a carbonate, though in so far as the oxide of the metal in question may be deliquescent, the use of the carbonate is normally to be preferred. However, it is also possible to use other compounds of the metals in question than oxides and carbonates, and some examples of these other compounds are borates, hydroxides, nitrates, nitrides, acetates and other organic-acid salts. It will be appreciated that if a metal borate is used as a catalyst it will act not only as a catalyst but also as a boric-oxide-providing substance, when the various substances used are raised to the temperature at which the boron nitride will be formed. This temperature should in general be over 1200° C., and in typical cases the preferred temperatures are within the range 1200° C. to 1600° C., though it has been found that the optimum temperature is liable to vary according to the nature of the catalyst. The optimum proportion of catalyst is also liable to vary according to the nature of the catalyst; by way of illustration, however, it may be stated that in certain fairly typical cases the weight of catalyst metal present in the heated intimate mixture (whether combined or uncombined) is 1% to 10% of the total weight of the mixture. Further illustrative catalyst-metal proportions may be obtained from the examples given below, As for the proportions of boric oxide (or boric-oxide-providing substance) and carbon, these may be stoichiometric but excess of boric oxide is preferred in order to ensure that no carbon remains in the product.

The particular advantages of the novel method of making boron nitride are that it enables good yields to be obtained at atmospheric pressure and that it enables the boron nitride to be obtained in a state of comparatively high purity. In the known method of making boron nitride by heating at high temperatures a mixture comprising merely boric oxide and carbon in an atmosphere of nitrogen, it was found, in contrast, that the yield was liable to be low unless a high pressure of nitrogen was used and that the product was liable to be contaminated with substantial amounts of carbon, boron, boron carbide, and unreacted boric oxide.

In the novel method of making boron nitride it is preferred that one measure or another should be taken to maintain the rate of conversion of the boric oxide or boric-oxide-providing substance into boron nitride as the heating and passing over of nitrogen or nitrogen-providing gas proceed, since it has been found that there is a tendency for this rate of conversion to decrease after a certain period, which in a typical case is of the order of 20 minutes, though it is of course liable to vary according to the temperature and other conditions. It is believed that this tendency for the rate of conversion to decrease may be due to the boric oxide or boric-oxide-providing substance coalescing and thus reducing the surface area available for reaction and also making it more difficult for gas to pass through the mixture. One measure which may be taken with a view to maintaining the rate of conversion is that of submitting the heated intimate mixture to grinding at intervals, the heating and the passing over of nitrogen or nitrogen-providing gas being continued after grinding. Alternatively the mixture may be stirred continuously during the time that the reaction is taking place, e.g., in a continuously rotating tube. Another measure which may be taken is that of using a heated intimate mixture which has the form of an expanded but coherent material and which is derived from a mixture comprising the boric oxide (or boric acid or other boric-oxide-providing substance), carbon, and catalyst, and in addition an organic binder. The organic binder used may for example be molasses, sugar, starch or another carbohydrate binder, or pitch, asphalt, tar or another hydrocarbon binder. This technique is described in more detail in our U.K. patent application No. 4,714/58. A similar measure which may be taken with a view to maintaining the rate of conversion consists in providing for the heated intimate mixture to be rendered porous by gas or vapour evolved from ammonium chloride or another substance which evolves gas or vapour at the temperatures at which the boron-nitride-producing reaction takes place, the heated intimate mixture having the gas or vapour evolving substance incorporated in it.

Even if a binder is not used as mentioned above, the ingredients of the heated intimate mixture used in the novel method are preferably made into a paste, with water if necessary, and formed into granules, e.g., by passing through a sieve. The optimum duration of the heating and passing over of nitrogen or nitgrogen-providing gas (or total duration, if the mixture is ground at intervals) varies according to the nature and proportion of the catalyst and according to the temperature, but it may in typical cases be of the order of several hours. The product is suitably freed of catalyst and unreacted boric oxide or boric-oxide-providing substance, as necessary, e.g., by extracting with dilute hydrochloric acid, washing the undissolved residue with water, and drying it.

The following examples illustrate the invention. The parts given in the examples are parts by weight. In Examples 2 to 39 inclusive, the conversion of boric oxide into boron nitride is deliberately kept incomplete in order that the effects of different catalysts, catalyst proportions, and temperatures may be observed.

EXAMPLE 1

6 parts of boric acid, 2½ parts of carbon and 1 part of calcium carbonate were mixed into a paste with 10 parts of water. The paste was pressed through a sieve to produce granules of size ⅛ inch to ⅜ inch in diameter, and these granules were then dried for 3 hours at 150° C.

The dried granules were charged into a vertical tube furnace with a heated length of 12 inches and a diameter of 2½ inches. Nitrogen was passed through the tube at 200 mls./minute for 6 hours, the temperature of the granules being 1400° C. The product was then removed. After cooling, it was extracted with dilute mineral acid, washed with water, and finally dried at 150° C.

EXAMPLE 2

Six parts of boric oxide (passing a 60-mesh sieve) 2½ parts of carbon black, and 1 part of manganese dioxide were intimately mixed together by grinding in a mortar. A four-gram sample of the mixture was placed in a boat which was inserted into a tube one inch in diameter heated to 1400° C., and nitrogen was passed through at about 250 ml. per minute. After one hour the boat was removed, and its contents were finely ground and replaced, and the boat was re-inserted into the heated tube for a further hour. The boat was then removed and allowed to cool. The contents, when cool, were finely ground, extracted with dilute hydrochloric acid, washed with water, and dried at 150° C. The fixed nitrogen content of the product was determined and from this it was calculated that the proportion of boron in the original mixture which had been converted into boron nitride was 35%.

EXAMPLES 3–7

The procedure followed was similar to that of Example 2, except that different proportions of manganese dioxide catalyst were used with a view to investigating the variation of the proportion of boron converted into nitride with variation in the catalyst proportion. The results obtained are shown in Table I below, the proportion of catalyst being expressed as a percentage of the weight of original boric oxide, carbon, and catalyst.

*Table I*

| Example | Percent $MnO_2$ catalyst | Percent conversion to BN |
|---|---|---|
| 3 | 25 | 41.0 |
| 4 | 10 | 34.2 |
| 5 | 4 | 20.5 |
| 6 | 1 | 7.4 |
| 7 | 0.1 | 4.8 |

EXAMPLES 8–12

The procedure followed was similar to that of Example 4, i.e., similar to that of Example 2 except in that the proportion of catalyst used was 10%, but various temperatures higher and lower than the 1400° C. of Examples 2 to 7 were used, with a view to investigating the variation with temperature of the proportion of boron converted into nitride. The results obtained are shown in Table II below, that of Example 4 being repeated to facilitate comparison.

*Table II*

| Example | Temperature (° C.) | Percent conversion to BN |
|---|---|---|
| 8 | 1,600 | 22.7 |
| 9 | 1,500 | 67.5 |
| 10 | 1,450 | 33.3 |
| 4 | 1,400 | 34.2 |
| 11 | 1,300 | 29.2 |
| 12 | 1,200 | 23.1 |

EXAMPLES 13–39

The procedure followed was similar to that of Example 2, except in that the one part of manganese dioxide was replaced by one part of various other metal oxide catalysts or by weights of metal carbonate catalysts equivalent to one part of the corresponding metal oxide. The results obtained are shown in Table III below.

*Table III*

| Example | Catalyst | Percent conversion to BN |
|---|---|---|
| 13 | Caesium carbonate | 10.6 |
| 14 | Rubidium carbonate | 14.1 |
| 15 | Potassium carbonate | 22.1 |
| 16 | Sodium carbonate | 14.0 |
| 17 | Lithium carbonate | 12.2 |
| 18 | Barium carbonate | 27.2 |
| 19 | Strontium carbonate | 27.8 |
| 20 | Calcium carbonate | 17.2 |
| 21 | Lanthanum oxide ($La_2O_3$) | 23.2 |
| 22 | Cerium dioxide ($CeO_2$) | 20.0 |
| 23 | Zirconium dioxide ($ZrO_2$) | 5.5 |
| 24 | Titanium dioxide ($TiO_2$) | 5.8 |
| 25 | Vanadium pentoxide ($V_2O_5$) | 14.8 |
| 26 | Tungsten trioxide ($WO_3$) | 20.6 |
| 27 | Molybdenum trioxide ($MoO_3$) | 52.9 |
| 28 | Chromic oxide ($Cr_2O_3$) | 36.2 |
| 29 | Ferric oxide ($Fe_2O_3$) | 10.7 |
| 30 | Cupric oxide (CuO) | 4.6 |
| 31 | Zinc oxide (ZnO) | 4.2 |
| 32 | Magnesium oxide (MgO) | 15.2 |
| 33 | Yttrium oxide ($Y_2O_3$) | 12.0 |
| 34 | Tantalum pentoxide ($Ta_2O_5$) | 13.4 |
| 35 | Niobium pentoxide ($Nb_2O_5$) | 52.4 |
| 36 | Nickel monoxide (NiO) | 5.1 |
| 37 | Cobalto-cobaltic oxide ($Co_3O_4$) | 10.3 |
| 38 | Thorium dioxide ($ThO_2$) | 6.5 |
| 39 | Barium carbonate ($BaCO_3$) and manganese dioxide ($MnO_2$) in equal parts. | 49.0 |

For the purpose of comparison it may be mentioned here that when a procedure was followed similar to that of Examples 2 and 13–39, but not using any catalyst, the percentage conversion of boron into nitride was only 1.3.

We claim:

1. In the method for producing boron nitride by heating in the presence of nitrogen an intimate admixture of carbon and boric oxide, the improvement which comprises heating said admixture at a temperature within the range of from about 1200° C. to about 1600° C. in the presence of from about 1% to about 10% of the weight of said admixture of a catalyst selected from the group consisting of molybdenum, niobium, manganese, chromium, calcium, barium, strontium, lithium, sodium, potassium, rubidium, cesium, magnesium, lanthanum, cerium, titanium, vanadium, cobalt, nickel, copper, zinc, yttrium, zirconium, tantalum, tungsten, and thorium, the oxides thereof, the carbonates thereof, the hydroxides thereof, the nitrates thereof, the nitrides thereof, and the acetates thereof; and extracting the resultant reaction mixture with dilute mineral acid to give substantially pure crystalline boron nitride.

2. The method of claim 1 which comprises removing the reaction admixture from the heat and nitrogen, grinding the reaction admixture and then continuing the heating in the presence of nitrogen.

3. The method of claim 1 where said catalyst is calcium carbonate.

4. The method of claim 1 where said catalyst is manganese dioxide.

5. The method of claim 1 in which said admixture contains a stoichiometric excess of said boric oxide.

6. The method of claim 1 in which said nitrogen is at substantially atmospheric pressure.

References Cited by the Examiner

UNITED STATES PATENTS

| | | | |
|---|---|---|---|
| 996,032 | 6/11 | Serpek | 23—191 X |
| 1,393,371 | 10/21 | Hoopes | 23—204 X |
| 2,313,410 | 3/43 | Walther. | |
| 2,959,469 | 11/60 | May | 23—191 |

FOREIGN PATENTS

| | | |
|---|---|---|
| 4,338 | 10/79 | Great Britain. |
| 777,234 | 1/57 | Great Britain. |
| 21,378 | 1914 | Great Britain. |

(Other references on following page)

FOREIGN PATENTS

| | | |
|---|---|---|
| 3,344 | 1912 | Great Britain. |
| 282,701 | 3/15 | Germany. |

OTHER REFERENCES

Stahler et al., "Berichte," vol. 46, pp. 2060–2077 (1913).

Mellor, "Comprehensive Treatise on Inorganic and Theoretical Chemistry," Longmans, Green and Co., N.Y., 1928, vol. VIII, pp. 108, 109, 110.

MAURICE A. BRINDISI, *Primary Examiner.*

GEORGE D. MITCHELL, *Examiner.*